(12) United States Patent
Rexroad et al.

(10) Patent No.: US 7,761,841 B1
(45) Date of Patent: Jul. 20, 2010

(54) ENHANCED DATA LOADING FOR TEST MANAGEMENT TOOL

(75) Inventors: George L. Rexroad, Roeland Park, KS (US); Darren C. Stuart, Shawnee, KS (US); James D. Thode, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1482 days.

(21) Appl. No.: 11/118,732

(22) Filed: Apr. 29, 2005

(51) Int. Cl.
*G06F 9/44* (2006.01)
(52) U.S. Cl. .................. 717/100; 717/124; 717/125
(58) Field of Classification Search .............. 717/125, 717/126
See application file for complete search history.

(56) References Cited

U.S. PATENT DOCUMENTS

| | | | |
|---|---|---|---|
| 5,367,667 A * | 11/1994 | Wahlquist et al. ............. 714/32 |
| 7,290,174 B1 * | 10/2007 | Gray et al. ..................... 714/33 |
| 7,328,134 B1 * | 2/2008 | Burbidge et al. ............ 702/186 |
| 2003/0056150 A1 * | 3/2003 | Dubovsky ..................... 714/38 |
| 2004/0107415 A1 * | 6/2004 | Melamed et al. ............ 717/124 |
| 2005/0229161 A1 * | 10/2005 | Wang et al. .................. 717/125 |
| 2009/0150867 A1 * | 6/2009 | Vorungati .................... 717/124 |

OTHER PUBLICATIONS

Tsai, "Mercury Testing Tool Mercury testing tool analysis," ASU, Nov. 6, 2004.*
Mercury TestDirector Test Management Software, "Mercury TestDirector", www.mercury.com, Jul. 22, 2005, 1 pg.
Mercury TestDirector Features, "Mercury TestDirector", www.mercury.com, Jul. 22, 2005, 1 pg.

* cited by examiner

*Primary Examiner*—Insun Kang

(57) ABSTRACT

A computer automated method to update a data store is disclosed. The method comprises receiving a definition mapping one or more information fields in an upload file to fields in a data store, creating a first linkage between a test set identified in a first record in the upload file and a first test case based on the mapping, and creating a test set record in the data store including the first linkage and data in the information fields in the first record in the upload file based on the definition.

20 Claims, 5 Drawing Sheets

ENHANCED DATA LOADING FOR TEST MANAGEMENT TOOL

CROSS-REFERENCE TO RELATED APPLICATIONS

None

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to computer based test management tools, and more particularly, but not by way of limitation, to enhanced data loading for a test management tool.

BACKGROUND OF THE INVENTION

Testing large software systems is a complicated process. Testing may include conducting long sequences of individual steps in particular orders. Testing a large software system may involve a team of testers who conduct testing over weeks or months. When testing newly added functionality, it may be desirable to be able to repeat the original testing of previously existing functionality to assure that the newly added functionality has not damaged the previously existing functionality. Maintaining a document or other artifact that can be used to guide testing may promote the repeatability of tests. Testing documents can also be used to record testing progress, for example checking off or otherwise designating tests as completed, and to generate reports for management.

The Mercury TestDirector™ is a software product that supports defining tests and requirements, tracking testing progress, and generating reports on testing activities. The TestDirector™ provides several different functionalities related to testing. In one operating environment, TestDirector™ provides a graphical user interface (GUI) that allows the user to examine and define requirements through a requirements module, to examine and define test cases through a test case module, and to examine and define test sets through a test lab module. The test case may be the smallest quantum of test activity represented in the TestDirector™. An example of a test case is logging into a customer account creation application. A test case, when executed, may involve multiple steps, for example providing a user name and a password, but this additional level of detail may not be captured in the TestDirector™ tool. A test set may comprise one or more test cases. An example of a test set is executing the test case of logging into a customer account creation application, executing the test case of providing customer information, executing the test case of confirming customer information, and executing the test case of completing customer account creation. A test set is defined within the TestDirector™ by creating links to a series of test cases.

SUMMARY OF THE INVENTION

According to one embodiment, computer automated method to update a data store is disclosed. The method comprises receiving a definition mapping one or more information fields in an upload file to fields in a data store, creating a first linkage between a test set identified in a first record in the upload file and a first test case based on the mapping, and creating a test set record in the data store including the first linkage and data in the information fields in the first record in the upload file based on the definition.

In another embodiment, an automated test documentation system is provided. The system comprises a data store containing information related to test sets and test cases, a test management tool using the information to record testing progress and to generate testing reports, a spreadsheet application operable to define and store test set definitions, and a script operable to process the test set definitions to create linkages between the test set and the test cases and to create entries in the data store, each entry containing one of the linkages between the test set and the test cases.

In still other embodiments, a method to build test sets is provided. The method comprises creating, based on an update file, a plurality of records in a data store, each record defining a linkage between a first test set and one of a plurality of test cases, displaying the linkage between the first test set and one or more test cases using a test management tool, creating a revised update file based on the update file, creating, based on the revised update file, a plurality of records in the data store, each record defining a linkage between a second test set and one of the plurality of test cases, and displaying the linkage between the second test set and one or more test cases using the test management tool.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

The Mercury TestDirector™ supports limited uploading of data from Microsoft Excel™ files. Requirements may be uploaded from a first Microsoft Excel™ file to be used by the requirements module. Test cases may be uploaded from a second Microsoft Excel™ file to be used by the test case module. Mercury TestDirector™, however, does not provide support for uploading test sets from Microsoft Excel™ files. It has been suggested that it was not possible to extend the Mercury TestDirector™ to enable automated creation of test sets in the Test Lab module. Manual creation of test sets using a GUI to point and click to select each test case to link to a test set and to define data content may be a tedious, time consuming, and error prone activity when large suites of test sets are involved. The present disclosure contains a description of a script that may be executed from a spreadsheet drop down add-in menu selection. The script promotes processing the spreadsheet contents and dialogues with a user to automatically generate test sets. This enhanced data loading mechanism may reduce test set definition errors and may reduce job completion time. In an embodiment, the enhanced data loading mechanism has been found to reduce test set definition time from about 10 hours to about 3 hours.

Figure 1:
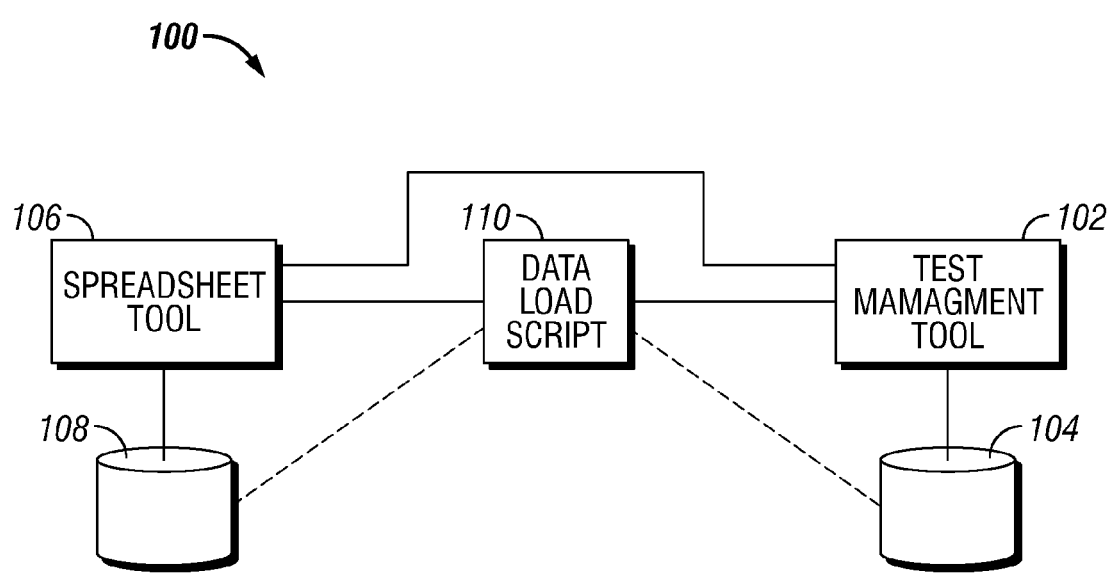
FIG. 1 is a block diagram of a test management system according to an embodiment of the present disclosure.

Turning now to FIG. 1, a block diagram of a system 100 for test management according to an embodiment of the present disclosure is depicted. The system 100 includes a test management tool 102 in communication with a first data store 104, a spreadsheet tool 106 in communication with a second data store 108 and with the test management tool 102, and a data load script 110 in communication with the spreadsheet tool 106 and the test management tool 102. The test management tool 102, the spreadsheet tool 106, and the data load script 110 are computer programs or scripts which may execute on a general purpose computer system. General purpose computer systems are discussed in greater detail hereinafter.

The first data store 104 maintains information related to one or more test documents, for example information used to define test requirements, test cases, and test sets. In an embodiment, the first data store 104 is an Oracle database, but in other embodiments other database or data store tools may be employed. The second data store 108 maintains spreadsheet information and may be one or more files in a file system or a database. In an embodiment, the test management tool 102 is Mercury TestDirector™. In an embodiment, the spreadsheet tool 106 is Microsoft Excel™.

The data load script 110, which may also be referred to as a macro, accesses test set information contained in the spreadsheet tool 106 that defines one or more test sets, each test set defined as one or more test cases. The test set information may be defined by a user employing the spreadsheet tool 106 to create a spreadsheet file. The spreadsheet file may define a test set as an ordered series of rows each identifying one test case. A row may include an identity of the test set, an identity of the test case, and optionally other information associated with the particular instance of the test case, for example distinguishing data values. The spreadsheet file may define a plurality of test sets. The data load script 110 may be implemented as a VISUAL BASIC script.

The data load script 110 may be executed by selecting a menu button provided in an interface to the spreadsheet tool 106. In an embodiment, the data load script 110 is executed by a menu selection in an Add-in portion of the Microsoft Excel™ GUI. The data load script 110 obtains a mapping definition from a user that the data load script 110 employs to associate or map entries in specific columns of the spreadsheet file to specific fields in the test set definitions. The data load script 110 may access the test set information by communicating with the spreadsheet tool 106 or may access the second data store 108 containing the spreadsheet file directly. The data load script 110 processes the test set information and communicates with the test management tool 102 to create definitions of test sets in the context of the test management tool 102. The test set definitions may comprise a series of row entries in a date base table wherein each row establishes a linkage between the test set and one test case. The test set is then defined as the ordered sequence of test cases linked with that test set by the date base table rows. The test cases are identified and defined in a separate portion of the data store 104, for example in one or more test case module data tables. The data load script 110 verifies that the test case identified in the date base table row entry exists in the first data store 104. When the test case fails to verify, the data load script 110 creates an entry in an error report, for example an Exception Report, and proceeds to access more test set information.

The test management tool 102 may save or store the test set definitions in the first data store 104. The Mercury TestDirector™ stores the test set definitions in association with a test lab module. The data load script 110 may communicate with the test management tool 102 by invoking methods or function calls on one or more application programming interfaces provided by the test management tool 102. In an embodiment, the data load script 110 may invoke methods or functions associated with Mercury TestDirector™ application programming interfaces including TSTestFactory, TestFactory, TestSetTreeManager, TestSetFactory, TestSetFolder, Customization, Customization Lists, and CustomizationUsers. Alternatively, in an embodiment, the data load script 110 may directly access the first data store 104 to write the test set definitions into the appropriate data tables or other structures.

In an embodiment, the data load script 110 is further operable to define linkages between requirements and test cases. These linkages may be stored in the first data store 104 in a requirements-to-test case mapping data table. Alternatively, these linkages may be stored in the first data store 104 associated with either the requirements module or the test cases module. The data load script 110 enables linkage of one requirement to many test cases, and/or linkage of many test cases to one requirement. For example, the present system enables one requirement to be mapped to multiple test cases, as well as for several test cases to be mapped to a single requirement. This provides added flexibility over one-to-one mapping of test requirements to test cases that may be useful for testing. In an embodiment, the data load script 110 is further operable to define linkages between requirements and test sets. These linkages may be stored in the first data store 104 in a requirements-to-test set mapping data table. Again, the data load script 110 enables linkage of one requirement to many test sets, and/or linkage of many test sets to one requirement. Alternatively, these linkages may be stored in the first data store 104 associated with either the requirements module or the test lab module.

The test management tool 102 may process requirements-to-test set linkages to generate a report of requirements satisfied by each test set and process requirements-to-test case linkages to generate a report of requirements satisfied by each test case. Alternatively, in an embodiment that does not define requirements-to-test set linkages, the test management tool 102 may generate a report of requirements satisfied by each test set by processing the requirements-to-test case linkages and associating requirements back to test sets using the test case to test set linkages.

Figure 2A:
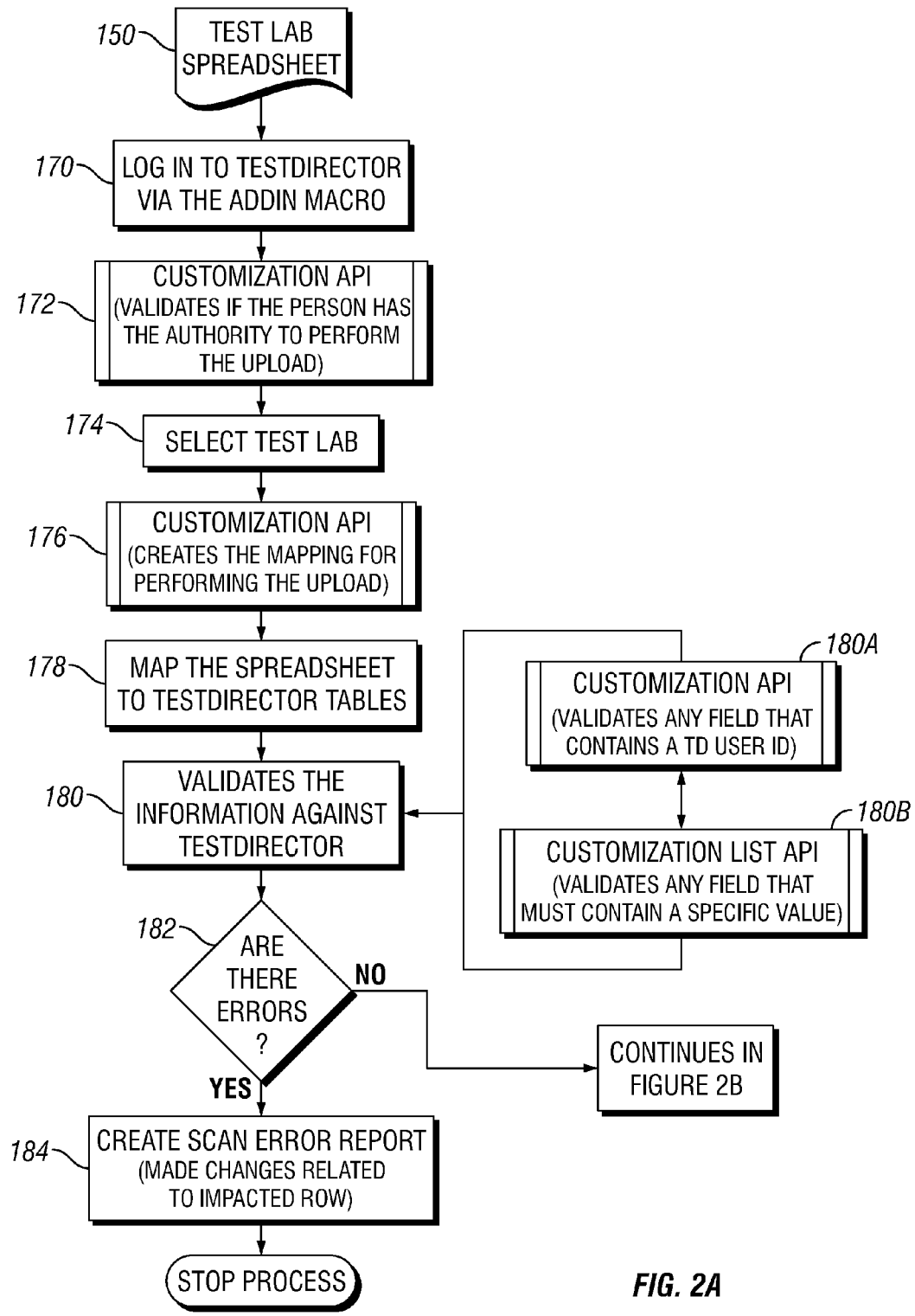
FIG. 2A is a flow diagram of a first portion of a method according to an embodiment of the present disclosure.

Turning now to FIG. 2A, a first portion of a method for performing enhanced data loading is depicted. The method may be implemented by the data load script 110. In an embodiment, a test lab spreadsheet 150, for example a Microsoft Excel™ spreadsheet, provides input to the data load script 110. The process begins at block 170 where the data load script 110 is executed and the user logs into the test management tool 102, for example the Mercury TestDirector™. The process proceeds to block 172 where the authority of the user to upload the test lab spreadsheet 150 to the test management tool 102 is validated by executing a method or function call using an application programming interface provided by the test management tool 102, for example the Customization application programming interface in the Mercury TestDirector™.

The process proceeds to block 174 where an appropriate operating mode or module of the test management tool 102 is selected, for example the Test Lab module of Mercury TestDirector™. The process proceeds to block 176/178 where the user defines a mapping from the columns of the test lab spreadsheet 150 to the fields of row entries in a data table in the first data store 104 using an application programming interface provided by the test management tool 102, for example the Customization application programming interface of the Mercury TestDirector™. The process proceeds to block 180 where the mapping provided in block 176/178 is validated using an application programming interface provided by the test management tool 102, for example the Customization application programming interface 180*a* and CustomizationList application programming interface 180*b* of the Mercury TestDirector™.

The process proceeds to block 182 where, if an error in the mapping was found in block 180, which may be referred to as a terminal error, the process proceeds to block 184 where an Scan Error Report or other error report is generated and the process terminates. In block 182, if no error in the mapping occurred, the process proceeds to block 200 depicted in FIG. 2B.

Figure 2B:
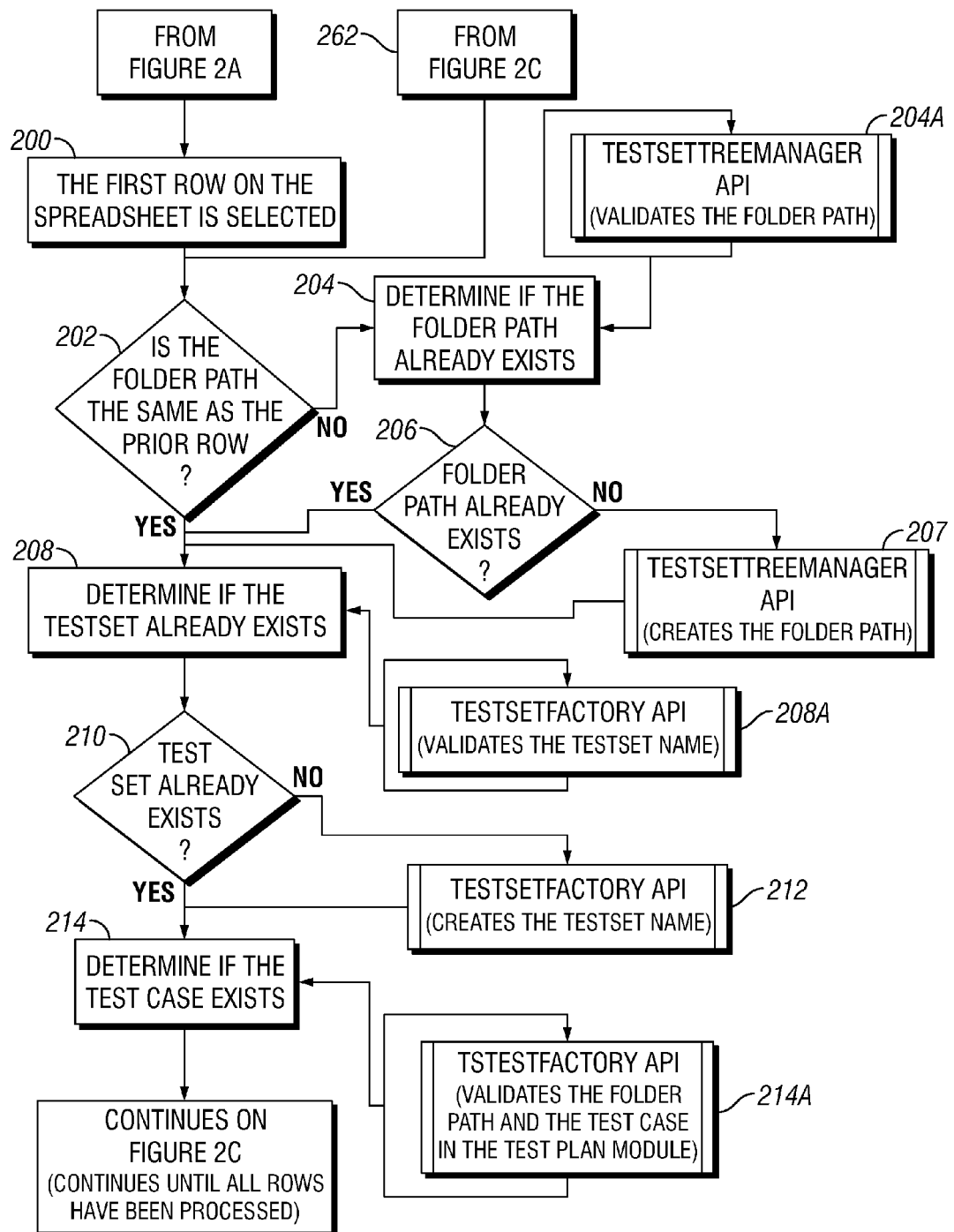
FIG. 2B is a flow diagram of a second portion of a method according to an embodiment of the present disclosure.

Turning now to FIG. 2B, a second portion of a method for performing enhanced data loading is depicted. The method resumes at block 200 where a first row of the test lab spreadsheet 150 is selected. The process proceeds to block 202 where, if the folder path identified in the selected row of the test lab spreadsheet 150 is not verified, meaning the folder path is changed or does not exist, the process proceeds to block 204. In block 204 the validity of the folder path is determined using an application programming interface provided by the test management tool 102, for example the TestSetTreeManager application programming interface 204*a* provided by Mercury TestDirector™. The process proceeds to block 206 where if the folder path does not exist, the process proceeds to block 207 where the folder path is created using an application programming interface provided by the test management tool 102, for example the TestSetTreeManager application programming interface provided by Mercury TestDirector™.

The process proceeds to block 208 where the validity and/or existence of the test set identified in the row of the test lab spreadsheet 150 is verified using an application programming interface provided by the test management tool 102, for example the TestSetFactory application programming interface 208*a* provided by Mercury TestDirector™. The process proceeds to block 210 where, if the test set does not exist, the process proceeds to block 212 where the test set is created using an application programming interface provided by the test management tool 102, for example the TestSetFactory application programming interface provided by the Mercury TestDirector™.

The process proceeds to block 214 where the test case is validated using an application programming interface provided by the test management tool 102, for example the TSTestFactory application programming interface 214*a* of Mercury TestDirector™. The process proceeds to block 250 in FIG. 2C.

Figure 2C:
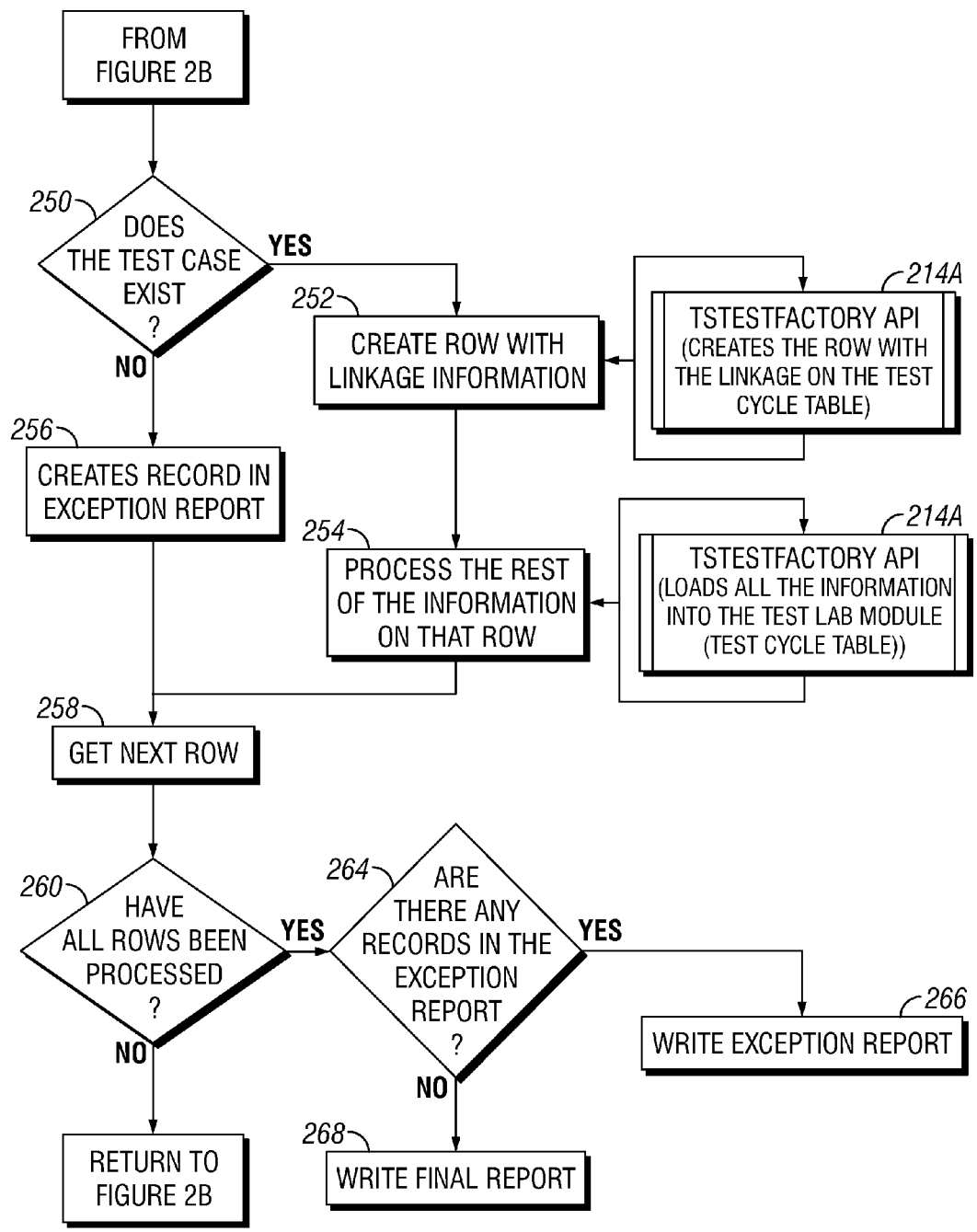
FIG. 2C is a flow diagram of a third portion of a method according to an embodiment of the present disclosure.

Turning now to FIG. 2C, a third and final portion of the method for performing enhanced data loading is depicted. In block 250, if the test case does exist, the process proceeds to block 252 where the row containing linkage information is created in the first data store 104 using an application programming interface provided by the test management tool 102, for example the TSTestFactory application programming interface 214*a* provided by Mercury TestDirector™. The process proceeds to block 254 where the remainder of the row of information from the test lab spreadsheet 150 is processed and written into the row in the first data store 104 using an application programming interface provided by the test management tool 102, for example the TSTestFactory application programming interface 214*a* provided by Mercury TestDirector™. In block 250, if the row does not exist, the process proceeds to block 256 where a record is created in an Exception Report.

The process proceeds to block 258 where the next row in the test lab spreadsheet 150 is accessed. The process proceeds to block 260 where, if all rows in the test lab spreadsheet 150 have not been processed, for example if the row read in block 258 is a valid row, the process proceeds to block 262 on FIG. 2B, repeating the row processing described above. If all the rows in the test lab spreadsheet 150 have been processed, the process proceeds to block 264 where, if no records were generated in the Exception Report, the process proceeds to block 268 where a final report is written and the process terminates. If one or more records were generated in the Exception Report, the process proceeds to block 266 where the Exception Report is written and the process terminates. On the successful completion of the method or process depicted in FIGS. 2A, 2B, and 2C test set definitions have been uploaded from the test lab spreadsheet 150 and the test management tool 102 has defined one or more test sets which may be examined, updated with status or progress information, and used as the basis of generating testing reports.

A process for updating existing test lab records stored in the first data store 104 is substantially similar to the process depicted in FIGS. 2A, 2B, and 2C, with the following differences. In block 204, if the folder path does not exist, a record is created in the Exception Report and the process proceeds to block 258. In block 210, if the test set does not exist, a record is created in the Exception Report and the process proceeds to block 258. In block 250, if the test case exists, the process updates the row information in the first data store 104 and then proceeds to block 258.

Figure 3:
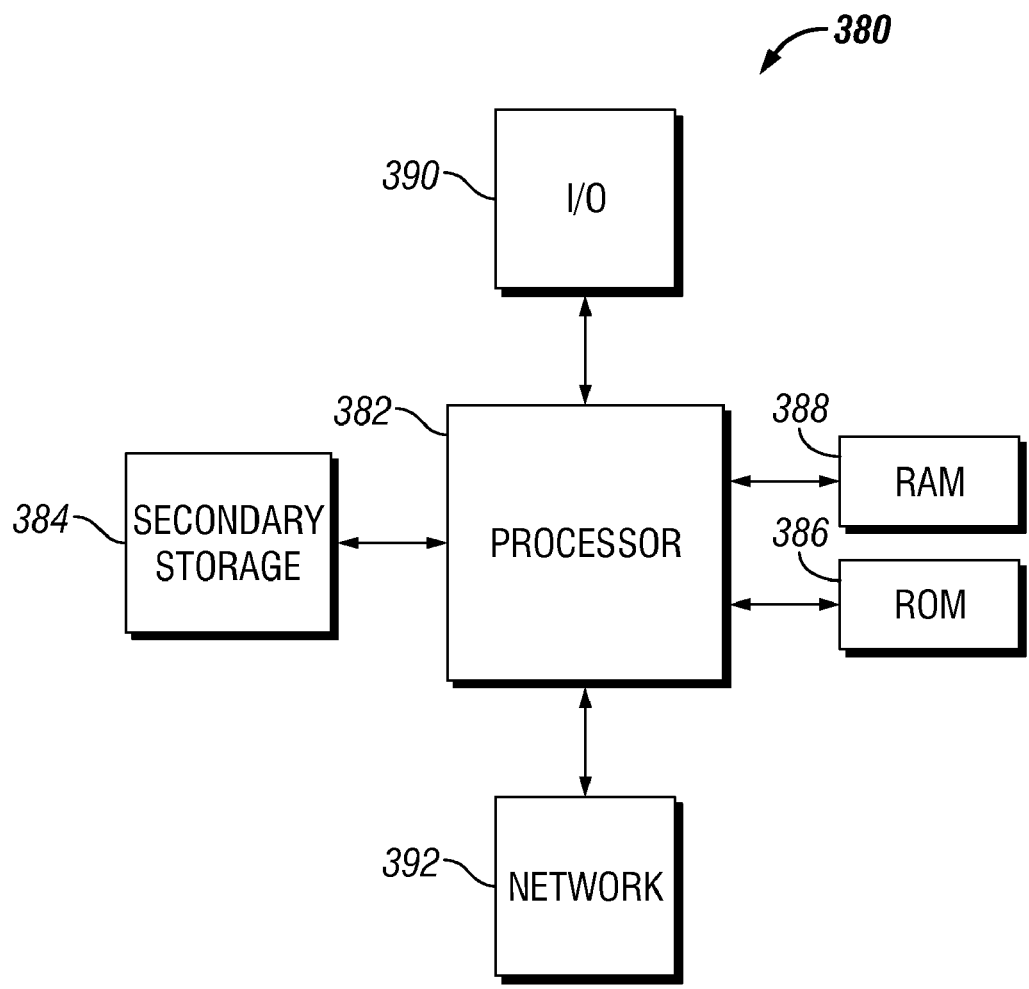
FIG. 3 illustrates an exemplary general purpose computer system suitable for implementing the several embodiments of the disclosure.

The system 100 described above may be implemented on any general-purpose computer with sufficient processing power, memory resources, and network throughput capability to handle the necessary workload placed upon it. FIG. 3 illustrates a typical, general-purpose computer system suitable for implementing one or more embodiments disclosed herein. The computer system 380 includes a processor 382 (which may be referred to as a central processor unit or CPU) that is in communication with memory devices including computer readable media such as secondary storage 384, read only memory (ROM) 386, random access memory (RAM) 388, input/output (I/O) devices 390, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O devices 390 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 392 may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer date baseband signal or signal embodied in a carrier wave. The baseband signal or signal embodied in the carrier wave generated by the network connectivity devices 392 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer automated method to update a data store, comprising:
    receiving, by a script executed by a spreadsheet application, a test set definition for mapping a plurality of information fields associated with at least a test
set defined as an ordered sequence of test cases and a plurality of test cases in a spreadsheet upload file from the spreadsheet application to fields in a data store of a test management tool, wherein the test management tool does not provide support for uploading the test set from the upload file;
    creating, by the script, based on the definition, a plurality of linkages, wherein each linkage is between the test set and one of the plurality of test cases in the upload file; and
    creating, by the script, based on the definition, a plurality of test set records for the test set in the data store, wherein each of the plurality of test set records includes one of the plurality of linkages, and wherein the test set is automatically uploaded to the data store by the script when the plurality of test set records for the test set is created.

2. The method of claim 1, wherein the creating the plurality of linkages and the creating the plurality of test set records employ an application programming interface provided by the test management tool.

3. The method of claim 2, wherein the test management tool is a Mercury TestDirector™ and wherein the creating the plurality of linkages includes using the Mercury TestDirector™ TSTestFactory application programming interface.

4. The method of claim 1, wherein the upload file is a Microsoft Excel™ file and the method is initiated by activating a macro selection button in a Microsoft Excel™ control window.

5. The method of claim 1, further including:
    creating a second linkage between a requirement in the data store and a second test case; and
    creating a requirement-to-test case association record in the data store including the second linkage.

6. The method of claim 5, further comprising:
    creating linkages between at least one requirement and a plurality of test cases; and
    creating linkages between at least one test case and a plurality of requirements.

7. The method of claim 1, further including:
    verifying the definition of the mapping between the plurality of information fields in the upload file and fields in the data store;
    generating a report when the verifying fails; and
    terminating the method when the verifying fails.

8. An automated test documentation system, comprising:
    a data store of a test management tool containing information related to a test set defined as an ordered sequence of test cases and a plurality of test cases, wherein the test management tool does not provide support for uploading the test set from a spreadsheet upload file;

the test management tool stored on a computer readable storage medium and executable by a processor to use the information related to the test set and the plurality of test cases to record progress of a testing project and to generate reports on the testing project;

a spreadsheet application stored on a computer readable storage medium and executable by a processor to define and store a test set definition related to the test set, the test set, and a plurality of test cases in the upload file; and a script stored on a computer readable storage medium and executable by the spreadsheet application to automatically upload the test set from the upload file to the data store, wherein the script processes the test set definition to create linkages between the test set and the plurality of test cases and to create entries in the data store, each entry containing one of the linkages between the test set and the plurality of test cases; wherein the test set is automatically uploaded to the data store by the script when the entries are created.

9. The system of claim 8, wherein the test set definition comprises a plurality of rows in a spreadsheet, each of the rows associating one of the plurality of test cases to the test set, thereby defining the test set as composed of one or more test cases.

10. The system of claim 8, wherein the test management tool is a Mercury TestDirector™.

11. The system of claim 10, wherein the script employs Mercury TestDirector™ application programming interfaces selected from the group consisting of TestFactory, TestSetTreeManager, TestSetFactory, TestSetFolder, TSTestFactory, Customization, CustomizationLists, and CustomizationUsers.

12. The system of claim 8, wherein the script is written using Visual Basic™.

13. The system of claim 8, wherein the script generates one or more error reports and halts entry creation when a terminal error occurs.

14. The system of claim 8, wherein the data store further contains information about a requirement, wherein the spreadsheet application defines and stores an association between one of the plurality of test cases and the requirement, and wherein the script processes the test set definition to create a linkage between the one of the plurality of test cases and the requirement and to create an entry in the data store containing the linkage between the one of the plurality of test cases and the requirement.

15. A method for building test sets, comprising:

creating a spreadsheet update file using a spreadsheet application, the update file comprising a test set definition, a plurality of information fields containing at least a first test set defined as an ordered sequence of test cases, and a plurality of test cases;

creating, by a script executed by the spreadsheet application, based on the definition related to the first test set, a plurality of records for the first test set in a data store of a test management tool so that the first test set is automatically uploaded from the update file to the data store by the script, each record in the data store storing a linkage, created by the script, between the first test set and one of the plurality of test cases, wherein the test management tool does not provide support for uploading the first test set from the update file;

displaying the linkage between the first test set and the one of the plurality of test cases using the test management tool;

creating a revised update file based on the update file using the spreadsheet application that comprises a plurality of information fields associated with at least a second test set and the plurality of test cases;

creating, by the script, based on a definition related to the second test set, a plurality of records for the second test set in the data store of the test management tool so that the second test set is automatically uploaded from the revised update file to the data store by the script, each record storing a linkage, created by the script, between the second test set and one of the plurality of test cases, wherein the test management tool does not provide support for uploading the second test set from the revised update file; and displaying the linkage between the second test set and the one of the plurality of test cases using the test management tool; wherein the first and second test set are automatically uploaded to the data store by the script when the plurality of records for the first and second test set is created.

16. The method of claim 15, further comprising:

creating linkages between at least one requirement in the data store and the plurality of test cases; and creating linkages between at least one test case and a plurality of requirements in the data store.

17. The method of claim 16, wherein the test management tool is a Mercury TestDirector™.

18. The method of claim 15, using Microsoft Excel™ to create the update file and the revised update file, and wherein at least some of the records in one of the update file and the revised update file are created by copying and pasting at least portions of other records.

19. The method of claim 15, wherein the creating the records in the data store is performed by Visual Basic™ code.

20. The method of claim 19, wherein the Visual Basic™ code validates that the plurality of test cases are present in the data store and generates an error report when a test case is determined to not be present in the data store.

* * * * *